United States Patent
Kouzu et al.

(10) Patent No.: US 10,892,482 B2
(45) Date of Patent: *Jan. 12, 2021

(54) NEGATIVE ELECTRODE MATERIAL FOR LITHIUM ION SECONDARY BATTERY, NEGATIVE ELECTRODE FOR LITHIUM ION SECONDARY BATTERY, AND LITHIUM ION SECONDARY BATTERY

(71) Applicant: HITACHI CHEMICAL COMPANY, LTD., Tokyo (JP)

(72) Inventors: Masayuki Kouzu, Hitachi (JP); Hideyuki Tsuchiya, Hitachi (JP); Katsutomo Ohzeki, Chiba (JP); Yoshie Oosaki, Chiba (JP); Tatsuya Nishida, Hitachi (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/438,285

(22) PCT Filed: Oct. 25, 2013

(86) PCT No.: PCT/JP2013/079037
§ 371 (c)(1),
(2) Date: Apr. 24, 2015

(87) PCT Pub. No.: WO2014/065418
PCT Pub. Date: May 1, 2014

(65) Prior Publication Data
US 2015/0270540 A1    Sep. 24, 2015

(30) Foreign Application Priority Data
Oct. 26, 2012    (JP) ................. 2012-237255

(51) Int. Cl.
*H01M 4/48* (2010.01)
*H01M 4/64* (2006.01)
(Continued)

(52) U.S. Cl.
CPC ............... *H01M 4/48* (2013.01); *C01B 33/12* (2013.01); *H01M 4/131* (2013.01); *H01M 4/134* (2013.01);
(Continued)

(58) Field of Classification Search
CPC ........ H01M 4/48; H01M 4/134; H01M 4/366; H01M 4/364; H01M 4/485; H01M 4/625;
(Continued)

(56) References Cited

U.S. PATENT DOCUMENTS

2003/0215711 A1* 11/2003 Aramata ............ B82Y 30/00
429/218.1
2004/0033419 A1* 2/2004 Funabiki ............ C01B 33/113
429/218.1
(Continued)

FOREIGN PATENT DOCUMENTS

CN    102214824 A    10/2011
EP    1363341 A2     11/2003
(Continued)

OTHER PUBLICATIONS

Office Action of CN Application No. 201380054630.0 dated Aug. 1, 2016 with English translation.
(Continued)

*Primary Examiner* — Lisa S Park
(74) *Attorney, Agent, or Firm* — Fitch, Even, Tabin & Flannery, LLP

(57) ABSTRACT

A negative electrode material for a lithium ion secondary battery includes a silicon oxide and having a diffraction peak attributable to Si (111) in an X-ray diffraction spectrum, in
(Continued)

which a size of a silicon crystallite calculated from the diffraction peak is from 2.0 nm to 8.0 nm.

14 Claims, 6 Drawing Sheets

(51) Int. Cl.

| | | |
|---|---|---|
| *H01M 10/0525* | (2010.01) | |
| *C01B 33/12* | (2006.01) | |
| *H01M 4/38* | (2006.01) | |
| *H01M 4/131* | (2010.01) | |
| *H01M 4/36* | (2006.01) | |
| *H01M 4/62* | (2006.01) | |
| *H01M 4/134* | (2010.01) | |
| *H01M 4/485* | (2010.01) | |

(52) U.S. Cl.
CPC ........... *H01M 4/364* (2013.01); *H01M 4/366* (2013.01); *H01M 4/386* (2013.01); *H01M 4/485* (2013.01); *H01M 4/625* (2013.01); *H01M 4/64* (2013.01); *C01P 2006/40* (2013.01); *H01M 10/0525* (2013.01); *H01M 2220/30* (2013.01)

(58) Field of Classification Search
CPC ........ H01M 4/131; H01M 4/64; H01M 4/386; H01M 2220/30; H01M 10/0525; C01B 33/12; C01P 2006/40
See application file for complete search history.

(56) References Cited

U.S. PATENT DOCUMENTS

| | | | |
|---|---|---|---|
| 2007/0224508 A1 | 9/2007 | Aramata et al. | |
| 2010/0009261 A1* | 1/2010 | Watanabe | H01G 11/42 429/231.8 |
| 2010/0015514 A1* | 1/2010 | Miyagi | H01M 4/131 429/129 |
| 2012/0021286 A1* | 1/2012 | Tabuchi | H01M 4/134 429/218.1 |
| 2015/0263339 A1 | 9/2015 | Kouzu et al. | |

FOREIGN PATENT DOCUMENTS

| | | |
|---|---|---|
| EP | 2372816 A1 | 10/2011 |
| JP | 2004047404 A | 2/2004 |
| JP | 2004-327190 A | 11/2004 |
| JP | 3952180 B2 | 8/2007 |
| JP | 2007294423 A | 11/2007 |
| JP | 4171897 B2 | 10/2008 |
| JP | 2009-259723 A | 11/2009 |
| JP | 2009-301935 A | 12/2009 |
| JP | 2010-225494 A | 10/2010 |
| JP | 2011-076788 A | 4/2011 |
| JP | 2011-076985 A | 4/2011 |
| JP | 2011090869 A | 5/2011 |
| JP | 2011-192453 A | 9/2011 |
| JP | 2011-222151 A | 11/2011 |
| JP | 2012033317 A | 2/2012 |
| JP | 2012-124114 A | 6/2012 |
| JP | 2012-151129 A | 8/2012 |
| KR | 10-2012-0080256 A | 7/2012 |
| TW | 2012-12352 A | 3/2012 |
| WO | 2012/015054 A1 | 2/2012 |
| WO | 2012/018035 A1 | 2/2012 |
| WO | 2012/026067 A1 | 3/2012 |
| WO | 2014/065418 A1 | 5/2014 |

OTHER PUBLICATIONS

International Search Report for International Application No. PCT/JP2013/079037 dated Jan. 28, 2014.
Search Report of EP Appln. No. 13849668.2 dated Mar. 18, 2016 in English.
Office Action of Taiwanese of Appln. No. 102138739 dated Oct. 27, 2016 with partial English translation.
Office Action of Chinese Patent Application No. 2013800546300 dated Apr. 21, 2017 with partial English translation.
Notification of Reasons for Refusal of Appln. No. JP2014-543371 dated Jul. 14, 2017 with machine translation (Cited in Opposition presented to JPO in corresponding JP application on Feb. 28, 2019).
Written Amendment of Appln. No. JP2014-543371 filed on Oct. 11, 2017 with machine translation (Cited in Opposition presented to JPO in corresponding JP application on Feb. 28, 2019).
Decision of Refusal of Appln. No. JP2014-543371 dated Jan. 19, 2018 with machine translation (Cited in Opposition presented to JPO in corresponding JP application on Feb. 28, 2019).
Notice of Appeal of Appln. No. JP2014-543371 filed on Apr. 26, 2019 with English translation (Cited in Opposition presented to JPO in corresponding JP application on Feb. 28, 2019).
Written Amendment of Appln. No. JP2014-543371 filed on Apr. 26, 2018 with machine translation (Cited in Opposition presented to JPO in corresponding JP application on Feb. 28, 2019).
Decision to Grant a Patent of Appln. No. JP2014-543371 dated Jun. 21, 2018 with machine translation (Cited in Opposition presented to JPO in corresponding JP application on Feb. 28, 2019).
Japanese Patent Examination Guidelines Part IV, Chapter 2, Item 3.3.1(4) with partial translation (Cited in Opposition presented to JPO in corresponding JP application on Feb. 28, 2019).

* cited by examiner

NEGATIVE ELECTRODE MATERIAL FOR LITHIUM ION SECONDARY BATTERY, NEGATIVE ELECTRODE FOR LITHIUM ION SECONDARY BATTERY, AND LITHIUM ION SECONDARY BATTERY

TECHNICAL FIELD

This invention relates to a negative electrode material for a lithium ion secondary battery, a negative electrode for a lithium ion secondary battery, and a lithium ion secondary battery.

BACKGROUND ART

Currently, graphite has been mainly used as a negative electrode material for a lithium ion secondary battery. It is known that graphite has a theoretical maximum capacity of 372 mAh/g. In recent years, in association with an increase in the performance of mobile devices, such as cell phones, notebook computers, and tablet-type terminals, demand for higher capacity of a lithium ion secondary battery has become stronger, and a negative electrode material capable of further improving capacity of a lithium ion secondary battery is required.

Therefore, the development of a negative electrode material using an element, which has high theoretical capacity and is capable of absorbing and desorbing a lithium ion (hereinafter, sometimes referred to as a "specific element", and a substance containing the specific element is sometimes referred to as a "specific element substance"), has become active.

As the specific element, silicon, tin, lead, aluminum, and the like are well known. Among these, silicon oxides, which is one of the specific element substances, have an advantage over other negative electrode materials composed of other specific elements, since they have a higher capacity, are inexpensive, and have excellent processability. Therefore, negative electrode materials containing a silicon oxide are being especially energetically studied.

Meanwhile, the specific element substances are known to cause remarkable cubical expansion when alloyed by charging. Such cubical expansion micronizes the specific element substance itself, and further destroys the structure of a negative electrode material using the specific element substance, leading to a cutoff of electrical conductivity. Therefore, it has a drawback in that the capacity decreases significantly over cycles.

To eliminate this drawback, Japanese Patent No. 3952180 discloses a conductive silicon composite for a negative electrode material of a non-aqueous electrolyte secondary battery, characterized in that a particle having a structure in which microcrystals of silicon are dispersed in a silicon compound is coated on the surface thereof with carbon, in which a diffraction peak attributable to Si (111) is detectable in x-ray diffractometry, and the silicon crystallite has a size of from 1 nm to 500 nm determined by a Scherrer method based on a half-value width of the diffraction peak.

According to the technique described in Japanese Patent No. 3952180, it is regarded that, by dispersing microcrystals or microparticles of silicon in an inert robust substance such as, for example, silicon dioxide, and further fusing carbon to at least a part of the surface thereof for imparting conductivity, a structure that not only has stable surface conductivity but is also stable against volume changes associated with absorption and desorption of lithium can be obtained, as a result of which long-term stability and initial efficiency can be improved.

Japanese Patent No. 4171897 discloses a negative electrode material for a non-aqueous electrolyte secondary battery, characterized in that the material is a conductive particle in which a surface of a material capable of absorbing and desorbing a lithium ion is coated with a graphite film, in which the amount of graphite coating is from 3% by weight to 40% by weight, a BET specific surface area is from 2 $m^2$/g to 30 $m^2$/g, and the graphite film has a graphite structure-intrinsic spectrum with Raman shifts of near 1330 $cm^{-1}$ and near 1580 $cm^{-1}$ by Raman spectroscopy.

According to the technique described in Japanese Patent No. 4171897, it is regarded that, by adjusting the physical property of the graphite film for coating the surface of the material capable of absorbing and desorbing a lithium ion to a specific range, a negative electrode material for a lithium ion secondary battery that achieves a property level satisfying demands of the market can be obtained.

Japanese Patent Application Laid-Open (JP-A) No. 2011-90869 discloses a negative electrode material for a non-aqueous electrolyte secondary battery, characterized in that the negative electrode material is obtained by coating the surface of a silicon oxide represented by the general formula $SiO_x$ with a carbon film and that the carbon film is a thermal plasma treated film.

According to the technique described in JP-A No. 2011-90869, it is regarded that the problems of cubical expansion of the electrode, which is a drawback of a silicon oxide, and cubical expansion of the battery due to gas generation can be solved, and a negative electrode material that has excellent cycle characteristics and is effective as a material for a non-aqueous electrolyte secondary battery can be obtained.

SUMMARY OF INVENTION

Technical Problem

However, in a case in which the silicon oxide, which is one material of the specific element substances, is used as a negative electrode material, the initial charge and discharge efficiency is low, and an excessive battery capacity of the positive electrode is required when applied to an actual battery. For this reason, in the conventional technique, the characteristics of the silicon oxide, i.e., its high capacity, have not been fully utilized in an actual lithium ion secondary battery. In addition, a negative electrode material that is applicable to a lithium ion secondary battery suitable for improving the performance of mobile devices and the like in the future will be required to store a large amount of lithium ions (that is, required to have a higher capacity) as well as to desorb more lithium ions that have been stored therein. Therefore, with regard to a negative electrode material that contributes to further improvement in the performance of a lithium ion secondary battery, both improvement in the initial discharge capacity and improvement in the initial charge and discharge efficiency are important.

In consideration of the above demands, an object of an aspect of the invention is to provide a negative electrode material for a lithium ion secondary battery having an excellent initial discharge capacity and an excellent initial charge and discharge efficiency, a negative electrode for a lithium ion secondary battery, and a lithium ion secondary battery.

Solution to Problem

As a result of intensive studies by the inventors, a negative electrode material for a lithium ion secondary battery as described below is found to be effective to approach the above problems and the present invention has been completed. The aspects of the invention are as follows.

<1> A negative electrode material for a lithium ion secondary battery, the negative electrode material comprising a silicon oxide and having a diffraction peak attributable to Si (111) in an X-ray diffraction spectrum, in which a size of a silicon crystallite calculated from the diffraction peak is from 2.0 nm to 8.0 nm.

<2> The negative electrode material for a lithium ion secondary battery according to <1>, in which the silicon oxide further comprises carbon on a part of the surface thereof or the entire surface thereof.

<3> The negative electrode material for a lithium ion secondary battery according to <2>, in which a content ratio of the carbon is 0.5% by mass or more and less than 5.0% by mass.

<4> The negative electrode material for a lithium ion secondary battery according to <2> or <3>, in which the carbon is a carbon with low crystallinity.

<5> A negative electrode for a lithium ion secondary battery, the negative electrode comprising:
a current collector; and
a negative electrode material layer that is provided on the current collector and comprising the negative electrode material for a lithium ion secondary battery according to any one of <1> to <4>.

<6> A lithium ion secondary battery, comprising:
a positive electrode; the negative electrode for a lithium ion secondary battery according to <5>; and
an electrolyte.

Advantageous Effects of Invention

According to the invention, there can be provided a negative electrode material for a lithium ion secondary battery having an excellent initial discharge capacity and an excellent initial charge and discharge efficiency, a negative electrode for a lithium ion secondary battery, and a lithium ion secondary battery.

DESCRIPTION OF EMBODIMENTS

Figure 1:
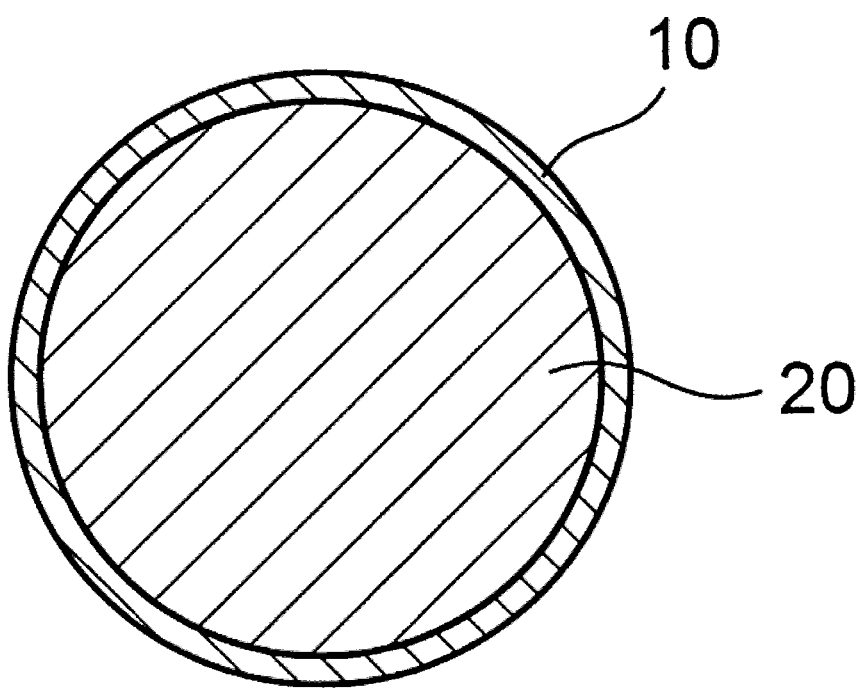
FIG. 1 is a schematic sectional view illustrating an example of a structure of a negative electrode material according to the invention.

In this specification, each numerical range specified using "(from) . . . to . . . " represents a range including the numerical values noted before and after "to" as the minimum value and the maximum value, respectively. Furthermore, when plural kinds of substances that correspond to the same component exist in the composition, the amount of the component in the composition refers to the total mass of the plural kinds of substances unless otherwise specified.

Negative Electrode Material for Lithium Ion Secondary Battery

The negative electrode material for a lithium ion secondary battery according to the invention (hereinafter, also abbreviated simply to "negative electrode material") includes a silicon oxide and has a diffraction peak attributable to Si (111) in the X-ray diffraction spectrum, in which the size of the silicon crystallite calculated from the diffraction peak is from 2.0 nm to 8.0 nm.

Since the silicon crystallite is present in the silicon oxide and the size of the silicon crystallite is within the specific range, increase in initial discharge capacity and improvement in initial charge and discharge efficiency can be achieved when the negative electrode material is used for constituting a lithium secondary battery. For example, it is conceivable that, when the size of the silicon crystallite is within the specific range, cubical expansion and constriction associated with absorption and desorption of a lithium ion can be reduced, and capacity degradation of the silicon oxide per unit area can be suppressed, whereby an excellent initial discharge capacity and an excellent initial charge and discharge efficiency can be obtained.

Silicon Oxide

The silicon oxide may be an oxide containing a silicon element, and examples thereof include silicon monoxide (also referred to as "oxidized silicon"), silicon dioxide, and silicon suboxide. The silicon oxide may be used singly, or in a combination of two or more kinds thereof.

Among the silicon oxides, oxidized silicon and silicon dioxide are generally represented by silicon monoxide (SiO) and silicon dioxide ($SiO_2$), respectively. However, depending on the surface state (for example, presence of an oxide film) or the generation condition, the silicon oxide is sometimes represented by the chemical formula $SiOx$ (x represents $0 < x \leq 2$) as an actual measured value (or a corresponding value) of an element contained, and this case is also included in the silicon oxide according to the invention. Here, the value of x can be calculated by measuring oxygen contained in the silicon oxide by an inert gas fusion-nondispersive infrared absorption method. In a case in which a disproportionation reaction ($2SiO \rightarrow Si + SiO_2$) of the silicon oxide is associated with the manufacturing process of the negative electrode material according to the invention, the silicon oxide is sometimes represented by the state including silicon and silicon dioxide (or in some cases, oxidized silicon) in the chemical reaction, and this case is also included in the silicon oxide according to the invention.

The oxidized silicon may be obtained, for example, by a known sublimation technique in which a silicon monoxide gas produced by heating a mixture of silicon dioxide and a metal silicon is cooled and precipitated. Alternatively, it is available as oxidized silicon, silicon monoxide, or SILICON MONOXIDE on the market.

The silicon oxide has a structure in which the silicon crystallite is dispersed in the silicon oxide. The state in which the silicon crystallite is dispersed in the silicon oxide results in the exhibition of a diffraction peak attributable to Si (111) in the X-ray diffraction spectrum.

The size of the silicon crystallite contained in the silicon oxide is from 2.0 nm to 8.0 nm. In a case in which the size of the silicon crystallite is less than 2.0 nm, the lithium ion and the silicon oxide tend to be easily reacted with each other, and sufficient initial discharge capacity does not tend to be obtained. In a case in which the size of the silicon crystallite exceeds 8.0 nm, the silicon crystallite is localized in the silicon oxide, and the diffusion of the lithium ion in the silicon oxide is suppressed, whereby the charge and discharge property tends to be degraded. The size of the silicon crystallite is preferably 3.0 nm or more, and more preferably 4.0 nm or more. From the viewpoint of the cycle characteristics, the size of the silicon crystallite is preferably 6.0 nm or less, and more preferably 5.0 nm or less.

The size of the silicon crystallite is a size of a silicon single crystal contained in the silicon oxide and is calculated based on a diffraction peak attributable to Si (111) in the X-ray diffraction spectrum. More specifically, the size is determined by a Scherrer equation based on a half-value width of a diffraction peak at 2θ=about 28.4° attributable to Si (111) in the X-ray diffraction spectrum obtained using CuKα with a wavelength of 0.154056 nm as a radiation source.

The presence of the state in which the silicon crystallite is dispersed in the silicon oxide can be confirmed by the presence of a diffraction peak attributable to Si (111) in the X-ray diffraction spectrum, or can be confirmed, for example, by observation of the presence of the silicon crystal in the amorphous silicon oxide when the silicon oxide is observed with a transmission electron microscope.

The structure in which the silicon crystallite is dispersed in the silicon oxide can be produced, for example, by appropriately adjusting the heat treatment temperature and the duration of the heat treatment as described below.

The average particle diameter of the silicon oxide is not particularly limited. For example, from the viewpoints of the initial discharge capacity and the cycle characteristics, the average particle diameter of the silicon oxide is preferably from 0.1 μm to 20 μm, and more preferably from 0.5 μm to 10 μm.

The average particle diameter is a particle diameter (D50%) at which the cumulative volume percentage reaches 50% in the particle size distribution, and the same applies to the following description regarding to the average particle diameter. The average particle diameter can be measured with a known technique such as a technique using a laser diffraction particle size distribution analyzer.

The method of producing the silicon oxide in which the silicon crystallite is dispersed is not particularly limited. For example, the silicon oxide is disproportionated by a heat treatment in a temperature range of from 700° C. to 1300° C. under an inert atmosphere, thereby producing the silicon oxide in which the silicon crystallite is dispersed. From the viewpoint of producing the silicon crystallite having a desired size, the heat treatment temperature is preferably 800° C. or higher, more preferably higher than 850° C., and still more preferably 900° C. or higher. The heat treatment temperature is preferably 1200° C. or lower, more preferably less than 1150° C., and still more preferably 1100° C. or lower.

Examples of the inert atmosphere include nitrogen atmosphere and argon atmosphere. The duration of the heat treatment can be appropriately selected in accordance with the heat treatment temperature or the like. The duration of the heat treatment is preferably from 1 hour to 10 hours, and more preferably from 2 hours to 7 hours, for example.

The size of the silicon crystallite tends to be larger with increasing the heat treatment temperature during the heat treatment or with increasing the duration of the heat treatment. Therefore, it is preferable to select the heat treatment temperature and the duration of the heat treatment such that the size of the silicon crystallite falls within a desired range. For example, in a case in which the duration of the heat treatment is set to from 2 hours to 7 hours, the heat treatment temperature is preferably higher than 850° C. and less than 1150° C., and more preferably from 900° C. to 1100° C.

With regard to the silicon oxide to be subjected to the heat treatment, in a case in which a bulk silicon oxide of a few centimeters square is prepared, it is preferable to pulverize and classify the bulk silicon oxide in advance. More specifically, it is preferable to perform a first pulverization in which the bulk silicon oxide is pulverized to a size suitable for charging it into a pulverizing mill followed by classification, and then a second pulverization in which the product is further pulverized using the pulverizing mill. The average particle diameter of the silicon oxide obtained by the second pulverization is preferably from 0.1 μm to 20 μm, and more preferably from 0.5 μm to 10 μm, in order to conform to the desired final size of the negative electrode material.

With regard to the negative electrode material, it is preferable that the silicon oxide further includes carbon on a part of the surface thereof or the entire surface thereof. As a result, the initial discharge capacity and the initial charge and discharge efficiency are further improved. The content ratio of the carbon in the negative electrode material is not particularly limited. In a case in which the negative electrode material contains carbon, the content ratio of the carbon is preferably 0.5% by mass or more and less than 5.0% by mass, more preferably from 0.5% by mass to 4.5% by mass, and still more preferably from 0.5% by mass to 4.0% by mass, with respect to the total mass of the negative electrode material.

The content ratio (in terms of mass) of carbon in the entire negative material can be determined by a high-frequency furnace combustion infrared absorption method. For example, in the high-frequency furnace combustion infrared absorption method, a sulfur/carbon simultaneous analyzer (CSLS600, manufactured by LECO Japan Corporation) may be used.

Figure 2:
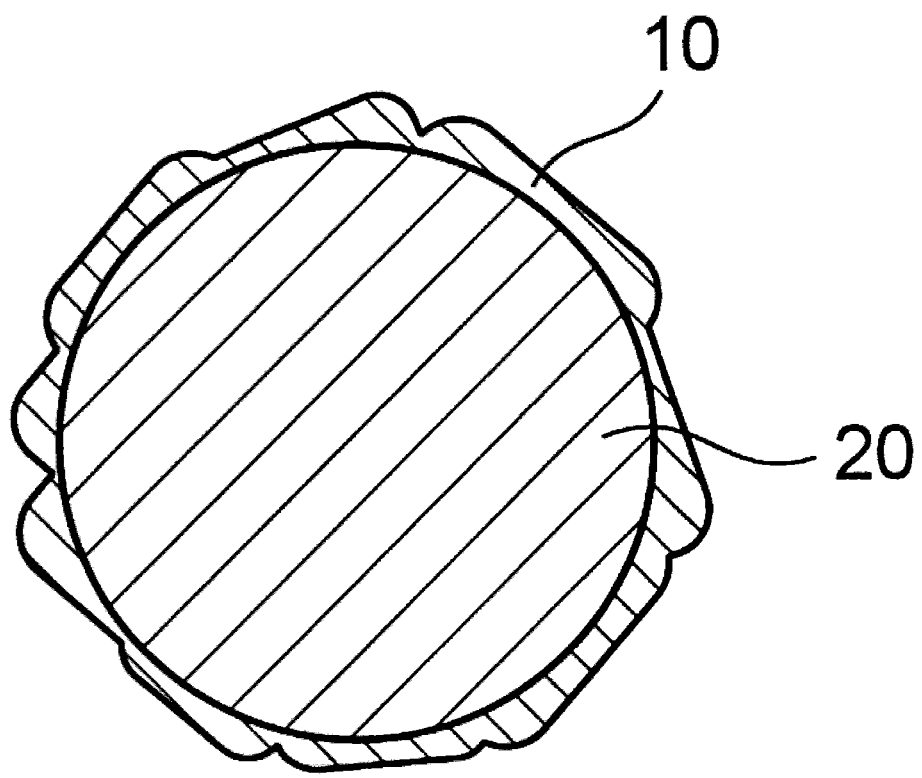
FIG. 2 is a schematic sectional view illustrating another example of a structure of a negative electrode material according to the invention.
Figure 3:
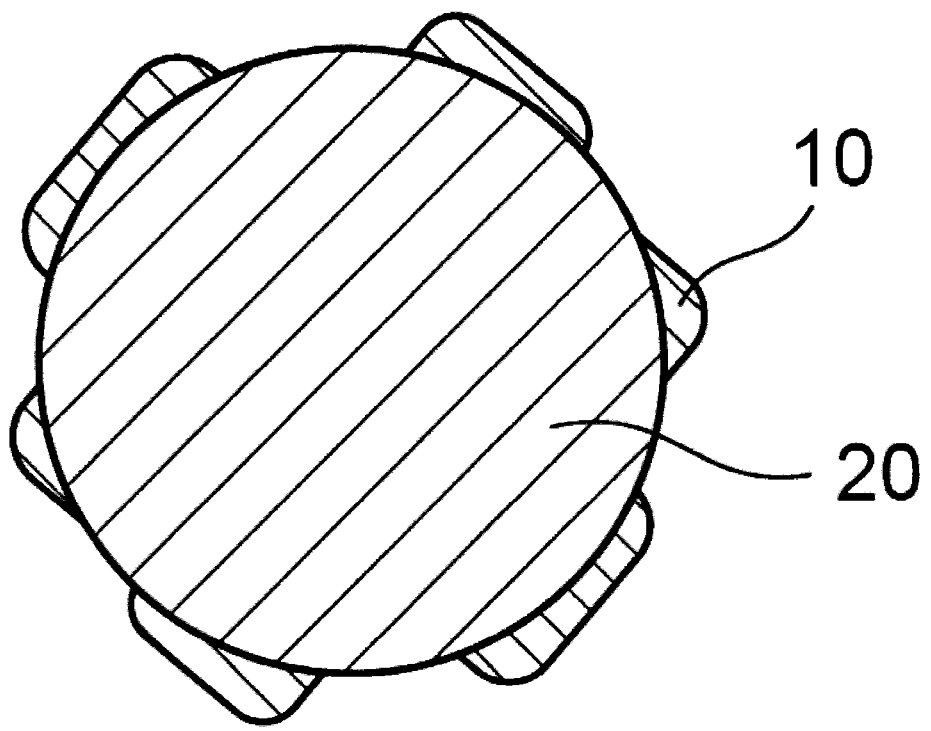
FIG. 3 is a schematic sectional view illustrating another example of a structure of a negative electrode material according to the invention.
Figure 4:
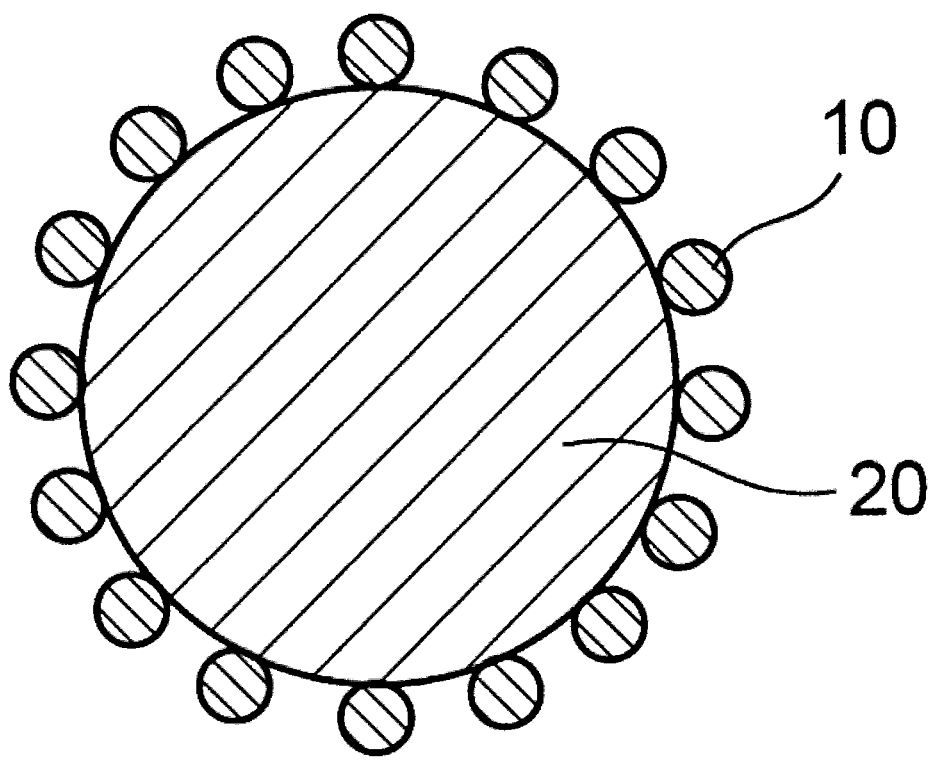
FIG. 4 is a schematic sectional view illustrating another example of a structure of a negative electrode material according to the invention.
Figure 5:
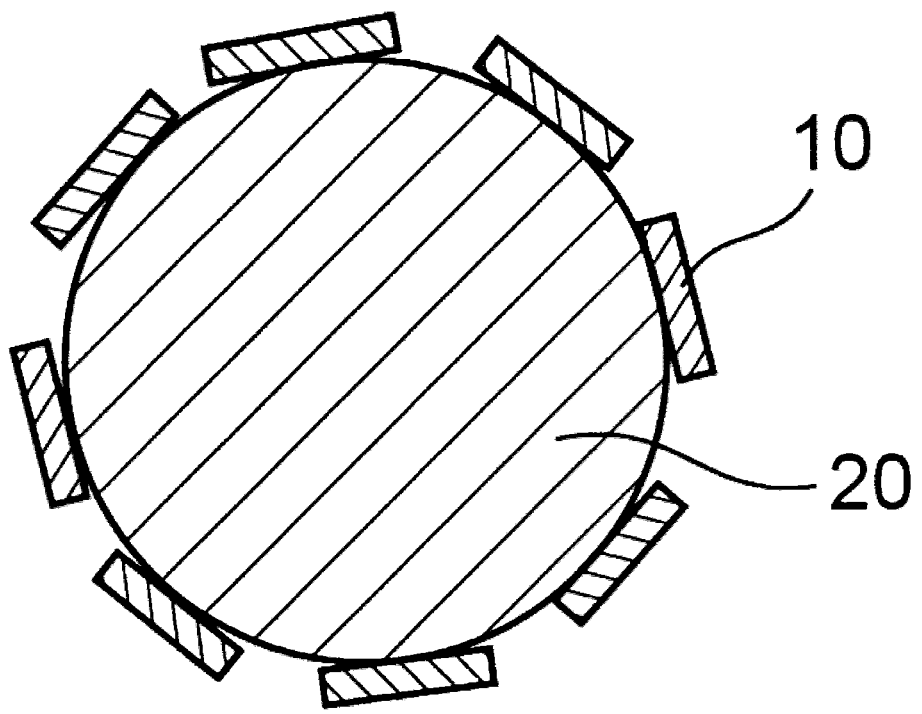
FIG. 5 is a schematic sectional view illustrating another example of a structure of a negative electrode material according to the invention.

In a case in which the silicon oxide in the negative electrode material according to the invention has carbon on a part of the surface thereof or the entire surface thereof, the structure of the negative electrode is not particularly limited. FIGS. 1 to 4 are schematic sectional views illustrating examples of the structure of the negative electrode material according to the invention, respectively. In FIG. 1, carbon 10 covers an entire surface of a silicon oxide 20. In FIG. 2, carbon 10 covers, but not uniformly, the entire surface of a silicon oxide 20. In FIG. 3, carbon 10 is present on a part of a surface of a silicon oxide 20, and thus the surface of the silicon oxide 20 is partially exposed. In FIG. 4, carbon 10 having a particle diameter smaller than that of a silicon oxide 20 is present on the surface of the silicon oxide 20. In FIG. 5, which shows a modified example of FIG. 4, the particle shape of carbon 10 is a scale-like shape. While the shape of the silicon oxide 20 is schematically indicated by a spherical shape (a circle as the cross-sectional shape) in FIGS. 1 to 5, the shape may be a spherical shape, a block-like shape, a scale-like shape, a shape in which with a polygonal cross-sectional shape (an angular shape), or the like.

Figure 6A:
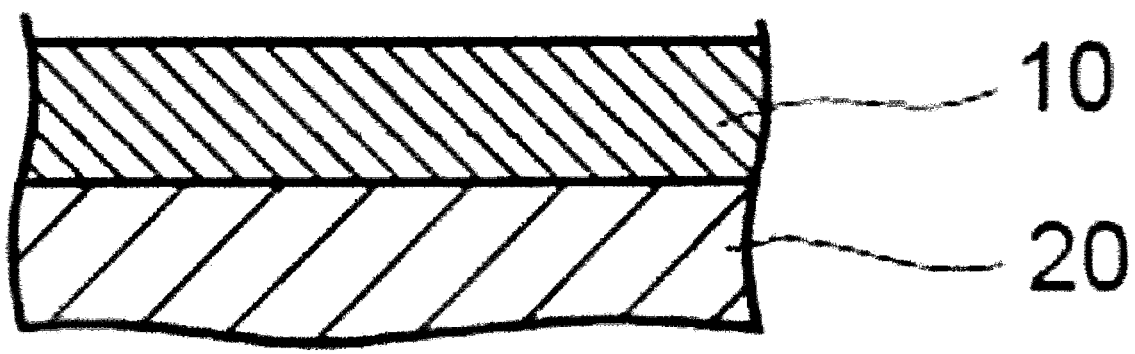
FIG. 6A is an enlarged sectional view of a part of the negative electrode material shown in FIGS. 1 to 3, illustrating an aspect of the state of carbon 10 in the negative electrode material.
Figure 6B:
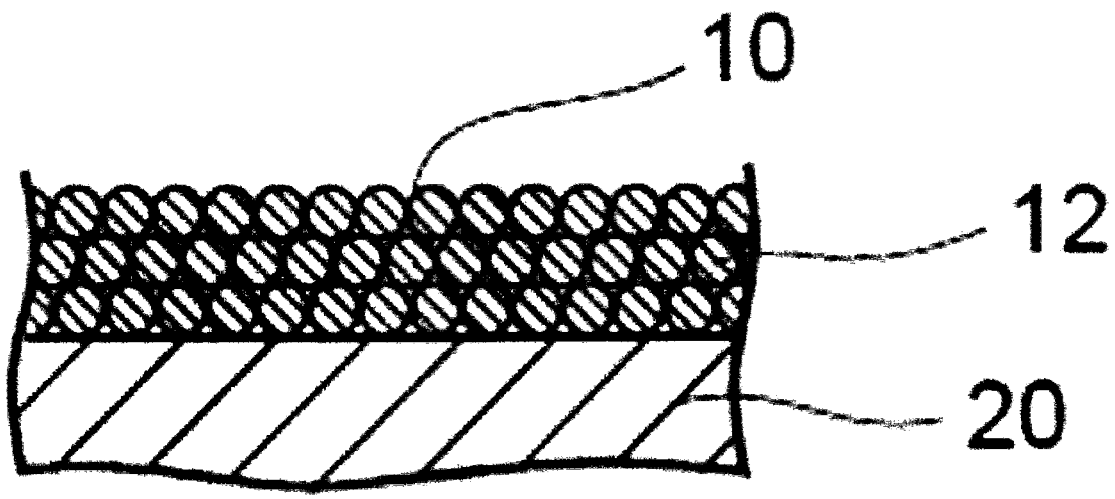
FIG. 6B is an enlarged sectional view of a part of the negative electrode material shown in FIGS. 1 to 3, illustrating another aspect of the state of carbon 10 in the negative electrode material.

Each of FIGS. 6A and 6B is an enlarged cross sectional view illustrating a part of the negative electrode material shown in FIGS. 1 to 3. FIG. 6A illustrates an aspect of the shape of the carbon 10 in the negative electrode material, and FIG. 6B illustrates another aspect of the shape of the carbon 10 in the negative electrode material. In the case shown in FIGS. 1 to 3, the carbon 10 may be constituted by carbon as a whole as shown in FIG. 6A, or may be constituted by microparticles 12 as shown in FIG. 6B. In FIG. 6B, while the microparticles 12 of the carbon 10 are shown by the state in which the outline thereof is remained, the microparticles 12 may be bonded to one another. In a case in which the microparticles 12 are bonded to one another, the carbon 10 is sometimes constituted by carbon as a whole, but may include a void in a part thereof. Thus, the carbon 10 may include a void in a part thereof.

In a case in which the carbon 10 has a particle shape, the particle of the carbon 10 may be present on a part of the surface of the silicon oxide 20, and thus the surface of the silicon oxide 20 is partially exposed as shown in FIG. 4; or the particle of the carbon 10 may be present on the entire surface of the silicon oxide 20 as shown in FIG. 6B.

In a case in which the negative electrode material includes carbon, the carbon is preferably a carbon with low crystallinity. The carbon with low crystallinity means a carbon having an R value in a Raman spectrum is 0.5 or more.

Provided that the R value is a peak intensity ratio Id/Ig (also referred to as D/G) of a peak intensity Id at around 1360 $cm^{-1}$ to a peak intensity Ig at around 1580 $cm^{-1}$ in a Raman spectrum analysis using an argon laser with a wavelength of 532 nm, the R value of the carbon in the Raman spectrum is preferably from 0.5 to 1.5, more preferably from 0.7 to 1.3, and still more preferably from 0.8 to 1.2. In a case in which the R value is 0.5 or more, a higher charge capacity tends to be obtained. In a case in which the R value is 1.5 or less, an increase in the irreversible capacity tends to be suppressed.

Here, the peak at around 1360 $cm^{-1}$ is a peak that is generally identified as corresponding to an amorphous structure of carbon, and observed at from 1300 $cm^{-1}$ to 1400 $cm^{-1}$ for example. The peak at around 1580 $cm^{-1}$ is a peak that generally identified as corresponding to the graphite crystal structure, and observed at from 1530 $cm^{-1}$ to 1630 $cm^{-1}$ for example.

The R value can be determined using a Raman spectrum measuring apparatus (for example, trade name: NSR 1000, manufactured by JASCO Corporation, at an excitation wavelength of 532 nm) with setting a baseline to 1050 $cm^{-1}$ to 1750 $cm^{-1}$ with respect to a measurement range (from 830 $cm^{-1}$ to 1940 $cm^{-1}$).

The method of applying carbon to the surface of the silicon oxide is not particularly limited, and examples thereof include a wet mixing method, a dry mixing method, and a chemical vapor deposition method. From the viewpoints of easiness of mixing and the control of a reaction system and maintaining the shape of the negative electrode material, a wet mixing method and a dry mixing method are preferable.

In the case of the wet mixing method, for example, the silicon oxide is mixed with a solution in which a carbon source is dissolved in a medium to attach the carbon source solution to the surface of the silicon oxide, followed by removal of the medium if needed, and then the resultant is subjected to a heat treatment in an inert atmosphere to carbonize the carbon source, thereby applying carbon to the surface of the silicon oxide. In a case in which the carbon source is insoluble or the like in a medium, a dispersed solution in which a carbon source is dispersed in a dispersion medium may be used in place of the above-described solution in which a carbon source is dissolved in a solvent.

In the case of the dry mixing method, for example, a mixture is prepared by mixing the silicon oxide in a solid state and the carbon source in a solid state, and the mixture is subjected to a heat treatment in an inert atmosphere to carbonize the carbon source, thereby applying carbon to the surface of the silicon oxide. A treatment for imparting mechanical energy (such as a mechanochemical treatment) may be performed when mixing the silicon oxide with the carbon source.

In the case of the chemical vapor deposition method, a known method may be used. For example, the silicon oxide is subjected to a heat treatment in an atmosphere containing vaporized gas of the carbon source to carbonize the carbon source, thereby applying carbon to the surface of the silicon oxide.

In a case in which carbon is applied to the surface of the silicon oxide by the above method, the carbon source is not particularly limited as long as it is a compound capable of leaving carbon by the heat treatment. Specific examples thereof include polymer compounds such as a phenol resin, a styrene resin, polyvinyl alcohol, polyvinyl chloride, polyvinyl acetate, or polybutyral; pitch such as ethylene heavy end pitch, coal pitch, petroleum pitch, coal tar pitch, asphalt decomposition pitch, PVC pitch obtained by pyrolyzing polyvinyl chloride or the like, or naphthalene pitch prepared by polymerizing naphthalene or the like under the presence of a super-strong acid; polysaccharides such as starch or cellulose. The carbon source may be used singly, or in a combination of two or more kinds thereof.

In a case in which carbon is applied to the surface of the silicon oxide by the chemical vapor deposition method, the carbon source may be an aliphatic hydrocarbon, an aromatic hydrocarbon, an alicyclic hydrocarbon or the like, and preferably a compound in the form of a gas or a compound capable of easily evaporating. Specific examples thereof include methane, ethane, propane, toluene, benzene, xylene, styrene, naphthalene, cresol, anthracene, and derivatives thereof. The carbon source may be used singly, or in a combination of two or more kinds thereof.

The heat treatment temperature for carbonizing the carbon source is not particularly limited as long as carbonization of the carbon source can be achieved at the temperature. The heat treatment temperature is preferably 700° C. or higher, more preferably 800° C. or higher, still more preferably higher than 850° C., and even more preferably 900° C. or higher. From the viewpoints of obtaining a carbon with low crystallinity and producing the silicon crystallite having a desired size, the heat treatment temperature is preferably 1300° C. or lower, more preferably 1200° C. or lower, still more preferably lower than 1150° C., and even more preferably 1100° C. or lower.

The duration of the heat treatment is appropriately selected according to the kind of the carbon source to be used, the application amount thereof, and the like. For example, the duration of the heat treatment is preferably from 1 hour to 10 hours, and more preferably from 2 hours to 7 hours.

The heat treatment is preferably performed in an inert atmosphere such as nitrogen or argon. The heat treatment apparatus is not particularly limited as long as the reaction apparatus to be used is provided with a heating machinery, and examples thereof include a heating apparatus applicable to a continuous or batch treatment. More specifically, a fluidized bed-furnace, a revolving furnace, a vertical moving bed furnace, a tunnel furnace, a batch furnace or the like may be appropriately used depending on the purpose thereof.

In a case in which the carbon is formed by the heat treatment of the carbon source, the heat treatment of the carbon source may also be performed for the purpose of disproportionating the silicon oxide. In this case, the condition for the heat treatment is preferably at from 700° C. to 1300° C. for 1 hour to 10 hours and more preferably at from 900° C. to 1100° C. for 2 hours to 7 hours, from the viewpoint of obtaining the negative electrode material containing the silicon crystallite having a desired size.

Since respective particles in the heat-treated product obtained by the heat treatment sometimes form aggregates, it is preferable to perform a disintegration treatment. In a case in which the adjustment of the average particle diameter to an intended size is required, a pulverization treatment may further be performed.

Examples of other method of applying carbon to the surface of the silicon oxide include a method using a carbonaceous material such as an amorphous carbon (e.g., soft carbon, hard carbon) or graphite as carbon to be applied to the surface of the silicon oxide. According to this method, the negative electrode material having a configuration in which the carbon 10 in a particulate state is present on the surface of the silicon oxide 20 as shown in FIGS. 4 and 5 can be produced. As the above-described method using the carbonaceous material, the wet mixing method or the dry wetting method as described above is applicable.

In a case in which the wet mixing method is applied, the microparticles of the carbonaceous material are mixed with an organic compound (a compound capable of leaving carbon by a heat treatment) as a binder to form a mixture, and then the mixture is further mixed with the silicon oxide, thereby attaching the mixture to the surface of the silicon oxide. The resultant is subjected to a heat treatment, whereby the negative electrode material is produced. The organic compound is not particularly limited as long as the compound is capable of leaving carbon by a heat treatment. In a case in which the wet mixing method is applied, the heat treatment condition for carbonizing the carbon source as described above is applicable to the condition for the heat treatment.

In a case in which the dry mixing method is applied, a mixture is prepared by mixing the microparticle of the carbonaceous material in a solid state and the silicon oxide in a solid state, and the mixture is subjected to a treatment for imparting mechanical energy (such as a mechanochemical treatment), whereby the negative electrode material is produced. Furthermore, in a case in which the dry mixing method is applied, it is preferable to perform a heat treatment to produce a silicon crystallite in the silicon oxide. In a case in which the dry mixing method is applied, the heat treatment condition for carbonizing the carbon source as described above is applicable to the condition for the heat treatment.

The average particle diameter of the negative electrode material based on the volume is preferable from 0.1 µm to 20 µm, and more preferably from 0.5 µm to 10 µm. In a case in which the average particle diameter is 20 µm or less, the negative electrode material is homogeneously-distributed in the negative electrode and cubical expansion and constriction during charging are homogenized, as a result of which a decrease in cycle characteristics tends to be suppressed. In a case in which the average particle diameter is 0.1 µm or more, the density of the negative electrode tends to be increased and the capacity tends to be increased.

The specific surface area of the negative electrode material is preferably from 0.1 $m^2/g$ to 15 $m^2/g$, more preferably from 0.5 $m^2/g$ to 10 $m^2/g$, and still more preferably form 1.0 $m^2/g$ to 7.0 $m^2/g$. In a case in which the specific surface area is 15 $m^2/g$ or less, an increase in the initial irreversible capacity of the obtained lithium ion secondary battery tends to be suppressed. In addition, an increase in the usage amount of the binder when producing the negative electrode tends to be suppressed. In a case in which the specific surface area is 0.1 $m^2/g$ or more, the area of the negative electrode that is exposed to an electrolyte tends to increase, and the charge and discharge efficiency tends to be improved. As the measurement method of the specific surface area, a known method such as a BET method (nitrogen gas adsorption method) may be used.

The negative electrode material is preferably one in which the size of the silicon crystallite is from 2.0 nm to 8.0 nm and that contains carbon in an amount of from 0.5% by mass or more and less than 5.0% by mass, and more preferably one in which the size of the silicon crystallite is from 3.0 nm to 6.0 nm and that contains carbon in an amount of from 0.5% by mass to 4.5% by mass.

If necessary, the negative electrode material may be used in combination with a carbon-based negative electrode material conventionally known as an active substance for the negative electrode of the lithium ion secondary battery. Depending of the kind of the carbon-based negative electrode material used in combination, the effect of improving the charge and discharge efficiency, the effect of improving the cycle characteristics, the effect of suppressing the cubical expansion of the electrode, and the like are obtained.

Examples of the conventionally known carbon-based negative electrode material include natural graphite such as flake-shaped natural graphite or spherical natural graphite obtained by spheroidizing flake-shaped natural graphite; artificial graphite; and amorphous carbon. The carbon-based negative electrode material may have carbon on a part of the surface thereof or the entire surface thereof. The single kind of the carbon-based negative electrode material or two or more kinds of the carbon-based negative electrode materials may be used by mixing with the negative electrode material according to the invention.

In a case in which the negative electrode material is used in combination with the carbon-based negative electrode material, the ratio (SiO-C:C) of the negative electrode material (represented by SiO-C) according to the invention to the carbon-based negative electrode material (represented by C) can be appropriately adjusted in accordance with the purpose. For example, from the viewpoint of the effect of suppressing the cubical expansion of the electrode, the ratio is preferably from 0.1:99.9 to 20:80, more preferably from 0.5:99.5 to 15:85, and still more preferably from 1:99 to 10:90, based on the mass.

Negative Electrode for Lithium Ion Secondary Battery

A negative electrode for a lithium ion secondary battery (hereinafter, sometimes abbreviated to "negative electrode") according to the invention includes: a current collector; and a negative electrode material layer which is provided on the current collector and includes the above-described negative electrode material for a lithium ion secondary battery. The negative electrode for a lithium ion secondary battery may be obtained, for example, by preparing a coating liquid that is a mixture of the negative electrode material for a lithium ion secondary battery, an organic binder, and a medium such as a solvent or water, and optionally a thickening agent, an electroconductive auxiliary material, a conventionally known carbon-based negative electrode material, and the like, and applying (coating) the coating liquid to the current collector, followed by drying the solvent or water and pressure forming, thereby forming a negative electrode material layer. In general, the negative electrode material for a lithium ion secondary battery is kneaded with the organic binder, the medium, and the like and shaped into a sheet form, a pellet form, or the like.

The organic binder is not particularly limited, and examples thereof include styrene-butadiene copolymers; (meth)acrylic copolymers obtained by copolymerization of an ethylenic unsaturated carboxylic acid ester (such as methyl(meth)acrylate, ethyl(meth)acrylate, butyl(meth)acrylate, (meth)acrylonitrile, or hydroxyethyl(meth)acrylate) and an ethylenic unsaturated carboxylic acid (such as acrylic acid, methacrylic acid, itaconic acid, fumaric acid, or maleic acid); and polymer compounds such as polyvinylidene fluoride, polyethylene oxide, polyepichlorohydrin, polyphosphazene, polyacrylonitrile, polyimide, or polyamide imide. Here, the term "(meth)acrylate" means "acrylate" and the corresponding "(meth)acrylate". The same applies to "(meth)acrylic copolymer" and other similar expressions.

The organic binder may be one dispersed or dissolved in water, or one dissolved in an organic solvent such as N-methyl-2-pyrrolidone (NMP), depending on the property thereof. Among these, in view of excellent adhesiveness, an organic binder having a main skeleton of polyacrylonitrile, polyimide, or polyamide imide is preferable; and from the viewpoints of a low heat treatment temperature during the production of the negative electrode and excellent electrode flexibility as described below, an organic binder having a main skeleton of polyacrylonitrile is more preferable. As the organic binder having a main skeleton of polyacrylonitrile, for example, a product (trade name: LSR-7, manufactured by Hitachi Chemical Co., Ltd.), in which an acrylic acid for imparting adhesiveness and a straight chain ether group for imparting flexibility are added to a polyacrylonitrile skeleton, may be used.

The content ratio of the organic binder in the negative electrode material layer of the negative electrode for a lithium ion secondary battery is preferably from 0.1% by mass to 20% by mass, more preferably from 0.2% by mass to 20% by mass, and still more preferably from 0.3% by mass to 15% by mass.

In a case in which the content ratio of the organic binder is 0.1% by mass or more, excellent adhesiveness tends to be achieved, and destruction of a negative electrode by cubical expansion and constriction in charging and discharging tends to be suppressed. Meanwhile, in a case in which the content ratio of the organic binder is 20% by mass or less, increase in electrode resistance tends to be suppressed.

As the thickening agent for adjusting the viscosity, carboxymethyl cellulose, methylcellulose, hydroxymethyl cellulose, ethyl cellulose, polyvinyl alcohol, polyacrylic acid (polyacrylate), oxidized starch, phosphorylated starch, casein or the like may be used in combination with the above-described organic binder.

The solvent used for mixing the organic binder is not particularly limited, and for example, N-methylpyrrolidone, dimethylacetamide, dimethylformamide, γ-butyrolactone, or the like is used.

An electroconductive auxiliary material may be added to the coating liquid. Examples of the electroconductive auxiliary material include carbon black, acetylene black, and an oxide or nitride having electrical conductivity. The electroconductive auxiliary material may be used singly, or in a combination of two or more kinds thereof. The content ratio of the electroconductive auxiliary material is preferably from 0.1% by mass to 20% by mass with respect to the negative electrode material layer (100% by mass).

The material and the shape of the current collector are not particularly limited, and examples of the material of the current collector include aluminum, copper, nickel, titanium, stainless steel, a porous metal (a foamed metal), and a carbon paper. The shape of the current collector include is not particularly limited, and examples thereof include a foil form, a perforated foil form, and a mesh form.

The method of applying (coating) the coating liquid to the current collector is not particularly limited. Examples of the application method include well known methods, such as a metal mask printing method, an electrostatic coating method, a dip coating method, a spray coating method, a roll coating method, a doctor blade method, a gravure coating method, or a screen printing method. After the applying (coating) of the coating liquid, if needed, a pressure treatment using a flat-plate plate press, a calendar roll, or the like is preferably carried out.

Integration of the coating liquid shaped into a sheet form, a pellet form, or the like with the current collector may be carried out by a well-known method such as rolling, pressing, or the combination thereof.

The negative electrode material layer formed on the current collector, or the negative electrode layer integrated with the current collector is preferably subjected to a heat treatment depending on the organic binder used. For example, in a case in which an organic binder having a polyacrylonitrile main skeleton is used, a heat treatment is preferably carried out at a temperature of from 100° C. to 180° C., and in a case in which an organic binder having a polyimide or polyamide-imide main skeleton is used, a heat treatment is preferably carried out at a temperature of from 150° C. to 450° C.

By the heat treatment, the strength is highly intensified through the removal of the medium and the curing of the organic binder, and the adhesiveness between the negative electrode materials and the adhesiveness between the negative electrode material and the current collector can be improved. The heat treatment is preferably carried out in an inert atmosphere, such as helium, argon, or nitrogen, or in a vacuum atmosphere, in order to prevent oxidization of the current collector during the treatment.

The negative electrode may preferably be pressed (pressure treatment) before the heat treatment. By the pressure treatment, the electrode density can be controlled. The electrode density of the negative electrode material for a lithium ion secondary battery according to the invention is preferably from 1.4 g/cm$^3$ to 1.9 g/cm$^3$, more preferably from 1.5 g/cm$^3$ to 1.85 g/cm$^3$, and still more preferably from 1.6 g/cm$^3$ to 1.8 g/cm$^3$. The higher the electrode density is, the more the volumetric capacity of the negative electrode tends to be improved and further the adhesiveness between negative electrode material particles and the adhesiveness between the negative electrode material particle and the current collector tends to be improved.

Lithium Ion Secondary Battery

A lithium ion secondary battery according to the invention includes: a positive electrode; the above-described negative electrode; and an electrolyte. The lithium ion secondary battery may further include a separator if necessary.

For example, a lithium ion secondary battery may be obtained by arranging the negative electrode and a positive electrode face to face, with a separator therebetween, and by injecting therein an electrolytic solution that contains an electrolyte.

The positive electrode may be obtained similarly as the negative electrode, by forming a positive electrode material layer on the surface of a current collector. As a current collector for the positive electrode, the current collector similar to one described for the negative electrode may be used.

With regard to the material to be used for the positive electrode of a lithium ion secondary battery (also referred to as "positive electrode material"), any compound may be used as long as it enables doping or intercalation of a lithium ion, and examples thereof include lithium cobaltate (LiCoO$_2$), lithium nickelate (LiNiO$_2$), and lithium manganate (LiMnO$_2$).

The positive electrode may be obtained by preparing a positive electrode coating liquid that is a mixture of the positive electrode material, an organic binder such as polyvinylidene fluoride, and a medium such as N-methyl-2-pyrrolidone or γ-butyrolactone, applying (coating) the positive electrode coating liquid to at least one surface of a current collector such as aluminum foil, and removing the medium by drying, followed by, if necessary, a pressure treatment.

An electroconductive auxiliary material may be added to the positive electrode coating liquid. Examples of the electroconductive auxiliary material include carbon black, acetylene black, and an oxide or nitride having electrical conductivity. The electroconductive auxiliary material may be used singly, or in a combination with two or more kinds of thereof.

The electrolytic solution used for the lithium ion secondary battery according to the invention is not particularly limited, and a known electrolytic solution may be used. For example, a non-aqueous lithium ion secondary battery can be produced by using a solution in which an electrolyte is dissolved in an organic solvent as the electrolytic solution.

Examples of the electrolyte include LiPF$_6$, LiClO$_4$, LiBF$_4$, LiClF$_4$, LiAsF$_6$, LiSbF$_6$, LiAlO$_4$, LiAlCl$_4$, LiN(CF$_3$SO$_2$)$_2$, LiN(C$_2$F$_5$SO$_2$)$_2$, LiC(CF$_3$SO$_2$)$_3$, LiCl, and LiI.

Any organic solvent may be used as long as it is capable of dissolving the electrolyte, and examples thereof include propylene carbonate, ethylene carbonate, diethyl carbonate, ethyl methyl carbonate, vinyl carbonate, γ-butyrolactone, 1,2-dimethoxyethane, and 2-methyltetrahydrofuran.

Any one of the various known separators may be used as the separator. Specific examples of the separator include a paper separator, a polypropylene separator, a polystyrene separator, and a glass fiber separator.

For example, in the production method of the lithium ion secondary battery, the two electrodes of the positive electrode and the second electrode are firstly wound together with the separator placed therebetween. The obtained wound group in a spiral shape is inserted in a cell casing, and a tab terminal, which has been welded to a current collector of the negative electrode in advance, is welded to the bottom of the cell casing. An electrolytic solution is injected into the obtained cell casing, and a tab terminal, which has been welded to a current collector of the positive electrode in advance, is welded to the lid of the cell casing. The lid is arranged on the top of the cell casing with an insulating gasket disposed therebetween, and the portion at which the lid contacts with the cell casing are swaged so as to seal them, thereby obtaining a battery.

The shape of the lithium ion secondary battery according to the invention is not particularly limited, and examples thereof include a paper battery, a button lithium ion secondary battery, a coin lithium ion secondary battery, a layered lithium ion secondary battery, a cylindrical lithium ion secondary battery, and a rectangular lithium ion secondary battery.

Although the negative electrode material for a lithium ion secondary battery according to the invention is described as a negative electrode material used for a lithium ion secondary battery, it may be applied generally to an electrochemical apparatus employing lithium-ion intercalation/deintercalation as a charge and discharge mechanism.

EXAMPLES

Hereinafter, the present invention is described more specifically with reference to Synthetic Examples, Examples and Comparative Examples, but the present invention is not limited to the examples. Here, "part(s)" and "%" are based on mass unless otherwise specified.

Example 1

Preparation of Negative Electrode Material

As a silicon oxide, a bulk oxidized silicon (manufactured by Kojundo Chemical Lab. Co., Ltd, standard 10 mm to 30 mm square) was coarsely ground in a mortar, thereby obtaining a silicon oxide particle. The silicon oxide particle was further ground with a vibrational mill (compact vibrational mill NB-0 (trade name), manufactured by NITTO KAGAKU Co., Ltd), and then the particle size thereof was regulated using a 300-M (300-mesh) test screen, thereby obtaining a microparticle having an average particle diameter of 5 μm.

Measurement of Average Particle Diameter

The measurement sample (5 mg) was add to a 0.01% by mass aqueous solution of surfactant (trade name: Ethomeen T/15, manufactured by Lion Corporation), and the mixture was dispersed using a vibrational stirrer. The obtained dispersion solution was placed in a sample vessel of a laser diffraction particle size distribution measurement apparatus (trade name: SALD 3000J, manufactured by Shimadzu Corporation), and measurement was carried out with a laser diffractometry method while circulating using a pump under an ultrasonic treatment. The measurement conditions are as follows. A particle size at which a cumulative volume reached 50% (D50%) in the obtained particle size distribution was defined as an average particle diameter. In the following Examples, the measurement of the average particle diameter was performed in a similar manner.

Light source: red-color semiconductor laser (690 nm)
Absorbance: 0.10 to 0.15
Refractive index: 2.00 to 0.20i 970 g of the obtained silicon oxide microparticle and 60 g of coal tar pitch (fixed carbon content: 50%) were charged in a mixing apparatus (rocking mixer RM-10G (trade name)) manufactured by AICHI ELECTRIC Co. Ltd., mixed for 5 minutes, and then charged in an alumina container for a heat treatment. After the completion of the charging in the container for a heat treatment, the resultant was subjected to a heat treatment using an atmosphere furnace in a nitrogen atmosphere at 900° C. for 5 hours, thereby obtaining a heat-treated product.

The obtained heat-treated product was ground in a mortar, and further mesh controlled with a 300-M (300-mesh) test screen, thereby obtaining a negative electrode material having an average particle diameter of 5.0 μm.

Method of Measuring Carbon Content Ratio

The carbon content ratio of the negative electrode material was measured by a high-frequency furnace combustion infrared absorption method. The high-frequency furnace combustion infrared absorption method is an analysis method in which a sample is heated and combusted in a high-frequency furnace under oxygen stream to convert oxygen and sulfur in the sample into $CO_2$ and $SO_2$, respectively, and the products are quantified with an infrared absorption method. The measurement apparatus, the measurement condition, and the like are as follows.

Apparatus: sulfur/carbon simultaneous analyzer (manufactured by LECO Japan Corporation, trade name: CSLS600)

Frequency: 18 MHz

High-frequency output: 1600 W

Sample mass: approximately 0.05 g

Analysis time: use in auto mode of the set mode of apparatus

Combustion improver: Fe+W/Sn

Standard sample: Leco501-024 (C: 3.03%±0.04, S: 0.055%±0.002)

Number of measurement: two times (the value of the carbon content ratio in Table 1 is an average of two measurements)

Measurement of R Value

The negative electrode material was analyzed using a Raman spectrum measurement apparatus (type NSR-1000, manufactured by JASCO Corporation) with setting a baseline of the obtained spectrum to the following range. The measurement conditions are as follows.

Laser wavelength: 532 nm

Irradiation intensity: 1.5 mW (the value measured with a laser power monitor)

Irradiation time: 60 seconds

Irradiation area: 4 µm$^2$

Measurement range: 830 cm$^{-1}$ to 1940 cm$^{-1}$

Base line: 1050 cm$^{-1}$ to 1750 cm$^{-1}$

The wavenumber of the obtained spectrum was corrected based on a calibration curve determined by a difference between the wavenumber of the respective peaks obtained by measuring a standard substance indene (manufactured by Wako Pure Chemical Industries, Wako first grade) under the same condition as above and the theoretical value of the wavenumber of the respective peaks of indene.

With respect to the profile obtained after the correction, the peak strength occurred at near 1360 cm$^{-1}$ and the peak strength occurred at near 1580 cm$^{-1}$ was defined as $I_d$ and $I_g$, respectively, and the ratio of the both peak intensities $I_d/I_g$ (D/G) was determined as an R value.

Measurement of BET Specific Surface Area

Nitrogen adsorption at the liquid nitrogen temperature (77 K) was measured with a 5 point method using a high-speed specific surface area/micropore distribution measurement apparatus ASAP 2020 (manufactured by Micromeritics), and a BET specific surface area was calculated by a BET method (relative pressure range: from 0.05 to 0.2).

Measurement of Size of Silicon Crystallite

The negative electrode material was analyzed using a powder X-ray diffraction measurement apparatus (MultiFlex (2 kW), manufactured by Rigaku Corporation). The size of the silicon crystallite was determined by a Scherrer equation based on a half-value width of a peak occurred at 2θ=about 28.4° attributable to a crystal face of Si (111).

The measurement condition is as follows.

Measurement Condition

Radiation source: CuKα radiation (wavelength: 0.154056 nm)

Measurement range: 2θ=10° to 40°

Step width of sampling: 0.02°

Scan speed: 1°/min

Tube current: 40 mA

Tube voltage: 40 kV

Divergence slit: 1°

Scatter slit: 1°

Light receiving slit: 0.3 mm

With regard to the obtained profile, removal of the background (BG) and separation of the peak were performed using a structure analyzing software (JADE 6, manufactured by Rigaku Corporation.) supplied with the above apparatus in accordance with the following settings.

Removal of Kα2 Peak and Removal of Background

Kα1/Kα2 intensity ratio: 2.0

Deviation (σ) of BG curve from BG point: 0.0

Designation of Peak

Peak attributable to Si (111): 28.4°±0.3°

Peak attributable to $SiO_2$: 21°±0.3°

Separation of Peak

Profile shape function: Pseudo-Voigt

Fixed background

The half-value width of the diffraction peak attributable to Si (111) calculated by the structure analyzing software in accordance with the above settings was read, and the size D of the silicon crystallite was calculated by the following Scherrer equation.

$$D = K\lambda/B \cos\theta$$

$$B = (B_{obs2} - b^2)^{1/2}$$

D: size (nm) of crystallite

K: Scherrer constant (0.94)

λ: wavelength of irradiation source (0.154056 nm)

θ: peak angle of measured half-value width $B_{obs}$: half-value width (the measured value obtained using the structure analyzing software)

b: measured half-value width of standard silicon (Si)

Production Method of Negative Electrode

To 3.75% by mass of the powder of the negative electrode material prepared by the above method and 71.25% by mass of an artificial graphite (manufactured by Hitachi Chemical Company, Ltd.) as the carbon-based negative electrode material (negative electrode material prepared:artificial graphite=5:95 (mass ratio)), 15% by mass of a powder of an acetylene black (manufactured by DENKA DENKI KAGAKU KOGYO KABUSHIKI KAISHA) as an electroconductive auxiliary material was added together with a LSR-7 (manufactured by Hitachi Chemical Company, Ltd.) as a binder in an amount of 10% by mass with respect to the total mass of the powders and the binder, and then the mixture was kneaded to prepare a slurry. The addition amount of the binder was adjusted to 10% by mass with respect to the total amount of the slurry. The slurry was applied to a glossy surface of an electrolytic copper foil such that the application amount is 10 mg/cm$^2$, subjected to a predrying treatment at 90° C. for 2 hours, and then the density was adjusted to 1.65 g/cm$^3$ by roll pressing. Subsequently, a curing treatment was performed by drying the resultant at 120° C. for 4 hours in a vacuum atmosphere, thereby obtaining a negative electrode.

Production of Lithium Ion Secondary Battery

Using the above-obtained electrode as the negative electrode, a metal lithium as a counter electrode, a mixed liquid of 1M $LiPF_6$ containing ethyl carbonate/ethyl methyl carbonate (volume ratio of 3:7) and vinyl carbonate (VC) (1.0% by mass) as an electrolytic solution, a polypropylene microporous film having a thickness of 25 μm as a separator, and a copper plate having a thickness of 250 μm as a spacer, a 2016-type coin cell was produced.

Evaluation of Cell

Initial Discharge Capacity, Charge and Discharge Efficiency

The above-obtained cell was placed in a thermostat kept at 25° C., and an initial charge capacity was measured by carrying out charging at a constant current of 0.43 mA (0.32 $mA/cm^2$) up to 0 V and then further charging at a constant voltage of 0 V until the current reached a value corresponding to 0.043 mA. After the charging, 30-minute pause was taken and then discharging was carried out. The discharging was carried out at a constant current of 0.43 mA (0.32 $mA/cm^2$) until the voltage value of 1.5 V, and then an initial discharge capacity was measured. Here, the capacity was converted to a value per the mass of the negative electrode material used (the total mass of the mixture of the negative electrode material produced and the artificial graphite). The value obtained by dividing the initial discharge capacity by the initial charge capacity was calculated as an initial charge and discharge efficiency (%).

Examples 2 to 5

Negative electrode materials were produced and evaluated in the same manner as in Example 1, except that the heat treatment temperature was changed to 950° C. (Example 2), 1000° C. (Example 3), 1500° C. (Example 4), or 1100° C. (Example 5), respectively, in the production of the negative electrode material of Example 1.

Comparative Example 1

A negative electrode material was produced and evaluated in the same manner as in Example 1, except that the heat treatment temperature was changed to 850° C. in the production of the negative electrode material of Example 1.

In the negative electrode material produced in Comparative Example 1, the diffraction peak attributable to Si(111) was not detectable and therefore denoted as "ND" in Table 1.

Comparative Example 2

A negative electrode material was produced and evaluated in the same manner as in Example 1, except that the heat treatment temperature was changed to 1150° C. in the production of the negative electrode material of Example 1.

The evaluation results of Examples and Comparative Examples are shown in the following Table 1.

TABLE 1

|  | Example 1 | Example 2 | Example 3 | Example 4 | Example 5 | Comparative Example 1 | Comparative Example 2 |
| --- | --- | --- | --- | --- | --- | --- | --- |
| Size of silicon crystallite [nm] | 2.0 | 3.0 | 4.0 | 6.0 | 8.0 | ND | 11.0 |
| R value (D/G) | 1.1 | 0.9 | 0.9 | 1.1 | 0.9 | 1.0 | 1.0 |
| BET specific surface area [$m^2/g$] | 3.7 | 3.2 | 2.0 | 2.2 | 2.0 | 4.3 | 1.9 |
| Average particle diameter [μm] | 5.0 | 5.0 | 5.0 | 5.0 | 5.0 | 5.0 | 5.0 |
| Carbon content ratio [% by mass] | 3.0 | 3.0 | 3.0 | 3.0 | 3.0 | 3.0 | 3.0 |
| Initial charge capacity [mAh/g] | 457 | 454 | 450 | 446 | 437 | 466 | 425 |
| Initial discharge capacity [mAh/g] | 407 | 406 | 406 | 402 | 395 | 408 | 385 |
| Charge and discharge efficiency [%] | 89.1 | 89.4 | 90.2 | 90.0 | 90.4 | 87.6 | 90.6 |

From the results shown in Table 1, it was found that the negative electrode materials for a lithium ion secondary battery shown in each of Examples 1 to 5 are each a negative electrode material having a large initial discharge capacity and an excellent initial charge and discharge efficiency compared to the negative electrode material of Comparative Example 1, in which the silicon crystallite is not detectable, and the negative electrode material of Comparative Example 2, in which the size of the silicon crystallite is 11.0 nm.

Meanwhile, in a case in which only an artificial graphite was used as the negative electrode material, the initial charge capacity was 378 mAh/g and the initial discharge capacity was 355 Ah/g. Based on the result obtained when only the artificial graphite was used, while the negative electrode materials in Examples each contain 5% by mass of the negative electrode material according to the invention and 95% by mass of the artificial graphite, it was found that the initial charge capacity and the initial discharge capacity are markedly improved even in the negative electrode material according to the invention with such a blending ratio.

The disclosure of Japanese Patent Application No. 2012-237255 is incorporated herein by reference in its entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. A lithium ion secondary battery, comprising:
  a positive electrode;
  a negative electrode for a lithium ion secondary battery comprising a current collector, and a negative electrode material layer provided on the current collector, the negative electrode material layer comprising a negative electrode material (SiOx-C) comprising:
    a silicon oxide represented by a formula SiOx (x is 0<+≤2) having silicon crystallite present and having a diffraction peak attributable to Si (111) in an X-ray diffraction spectrum,
      wherein a size of silicon crystallite calculated from the diffraction peak is from 2.0 nm to 8.0 nm,
      wherein the silicon oxide further comprises carbon on a part of a surface thereof or the entire surface thereof,
      wherein the carbon has an R value in a Raman spectrum of from 0.5 to 1.5, and wherein a content ratio of the carbon is 0.5% by mass or more and less than 5.0% by mass; and an electrolyte, wherein the negative electrode material layer further comprises a carbonaceous negative electrode material (C), and a ratio of the negative electrode material (SiOx-C) to the carbonaceous negative electrode material (C) is from 1:99 to 10:90 in terms of mass.

2. The lithium ion secondary battery according to claim 1, wherein the carbon is provided on a part of the surface of the silicon oxide.

3. The lithium ion secondary battery according to claim 1, wherein the carbon is provided on the entire surface of the silicon oxide.

4. The lithium ion secondary battery according to claim 1, wherein the R value of the carbon in the Raman spectrum is from 0.7 to 1.3.

5. The lithium ion secondary battery according to claim 1, wherein the R value of the carbon in the Raman spectrum is from 0.8 to 1.2.

6. The lithium ion secondary battery according to claim 1, wherein the R value of the carbon in the Raman spectrum is from 0.7 to 1.5.

7. The lithium ion secondary battery according to claim 1, wherein the R value of the carbon in the Raman spectrum is from 0.8 to 1.5.

8. The lithium ion secondary battery according to claim 1, wherein the R value of the carbon in the Raman spectrum is from 0.5 to 1.3.

9. The lithium ion secondary battery according to claim 1, wherein the R value of the carbon in the Raman spectrum is from 0.5 to 1.2.

10. The lithium ion secondary battery according to claim 1, wherein a size of a silicon crystallite calculated from the diffraction peak is from 2.0 nm to 6.0 nm.

11. The lithium ion secondary battery according to claim 1, wherein the content ratio of the carbon is 0.5% by mass to 4.5% by mass.

12. The lithium ion secondary battery according to claim 1, wherein a size of a silicon crystallite calculated from the diffraction peak is from 2.0 nm to 5.0 nm.

13. The lithium ion secondary battery according to claim 1, wherein a size of a silicon crystallite calculated from the diffraction peak is from 3.0 nm to 8.0 nm.

14. The lithium ion secondary battery according to claim 1, wherein a size of a silicon crystallite calculated from the diffraction peak is from 4.0 nm to 8.0 nm.

* * * * *